United States Patent
Bender et al.

(10) Patent No.: US 6,247,361 B1
(45) Date of Patent: Jun. 19, 2001

(54) METHOD AND APPARATUS FOR DETERMINING THE CONTENTS OF A GAS BOTTLE

(75) Inventors: Helmuth Bender, Eschenburg-Wissenbach (DE); Hans Roelvink, Rotterdam; André Veltman, Culemborg, both of (NL)

(73) Assignee: Reich KG Regel-Und Sicherheitstechnik, Eschenburg-Wissenbach (DE)

( * ) Notice: Subject to any disclaimer, the term of this patent is extended or adjusted under 35 U.S.C. 154(b) by 0 days.

(21) Appl. No.: 09/309,944

(22) Filed: May 11, 1999

(51) Int. Cl.$^7$ .................................................. G01F 23/28
(52) U.S. Cl. ............................................................ 73/290 V
(58) Field of Search ................................. 73/290 V, 579, 73/580, 149

(56) References Cited

U.S. PATENT DOCUMENTS

| | | | |
|---|---|---|---|
| 4,841,256 | * 6/1989 | Gastgeb | 73/290 V |
| 5,261,274 | 11/1993 | Nemirow | 73/149 |
| 5,264,831 | * 11/1993 | Pfeiffer | 73/290 V |
| 5,886,262 | * 3/1999 | Sinha | 73/579 |

FOREIGN PATENT DOCUMENTS

| | | |
|---|---|---|
| 296 06 594 U1 | 7/1996 | (DE) . |
| 195 32 378 A1 | 3/1997 | (DE) . |
| 0 119 790 A1 | 9/1984 | (EP) . |
| 2 146 770 | 4/1985 | (GB) . |
| 2 298 279 | 8/1996 | (GB) . |
| WO 82/01584 | 5/1982 | (WO) . |

* cited by examiner

Primary Examiner—John E. Chapman
(74) Attorney, Agent, or Firm—Schmeiser, Olsen & Watts

(57) ABSTRACT

Disclosed is a method for determining the contents of a gas bottle, in particular a liquid gas bottle, comprising the following steps: First of all, the gas bottle is excited by applying a signal to a loudspeaker mounted on said gas bottle. The signal from a microphone mounted on the gas bottle is compared in phase with the signal used for excitation, with the frequency of the signal applied to said loudspeaker being altered continuously, until a resonant frequency is established. This resonant frequency is converted into a filling level of the gas bottle according to a previously determined relationship between the resonant frequency and the filling level. Furthermore, an apparatus is disclosed with which the above-mentioned method may be put into practice.

16 Claims, 3 Drawing Sheets

METHOD AND APPARATUS FOR DETERMINING THE CONTENTS OF A GAS BOTTLE

The present invention relates to a method for determining the contents of a gas bottle, in particular the contents of gas bottles commonly used for camping, on boats, in caravans, in camping cars, in holiday homes but also in normal households or by craftsmen as a transportable source of energy for heating with an open flame. The invention furthermore relates to an apparatus for determining the contents of a gas bottle.

So far, users of gas bottles have been able to determine the total or residual contents of such bottles made of pressure resistant material by weighing them on a scale for example (cf. e.g. DE 195 32 378). However, this is not always possible. For this purpose, the precise empty weight of the bottle itself must be known, and the filling level will then have to be calculated from a weight difference. This entire operation is not only labor- as well as time-intensive, but also inaccurate.

It has further been known to mount temperature-sensitive strips on the shell of the gas bottles, or to provide temperature sensors on the inside of gas containers (cf. DE 296 06 594). The difference in temperature between the area of the gas bottle which still contains the liquified gas and the area which has already been emptied allows an approximate estimate of the filling level to be made. However, this solution, too, is rather inaccurate and may also be influenced by fluctuations of the outside temperature, amongst other things.

It is therefore the object of the invention to provide a method of the aforementioned kind which constitutes a simple and reliable way of determining the bottle contents, is easily feasible by anybody and may be implemented at low cost.

Such object is accomplished according to the present invention by the following steps. First of all, a gas bottle is excited by the application of a signal to a loudspeaker mounted on the gas bottle. The phase of the signal used for such excitation is compared with that of the signal from a microphone, with the frequency of the signal applied to the loudspeaker being altered continuously until a resonant frequency is established. Based on the established resonant frequency, the filling level of the gas bottle is subsequently determined.

It is a further object of the invention to provide an apparatus for determining the contents of a gas bottle which constitutes a simple and reliable way of determining the bottle contents, is easily feasible by anybody and may be implemented at low cost.

In accordance with the invention, such an apparatus comprises a loudspeaker to which a signal for exciting the gas bottle may be applied and which may be placed on the gas bottle in operation, a phase detector for comparing the phase of the signal used for excitation with that of a signal from a microphone mounted on the gas bottle, an oscillator outputting the signal used for excitation, with the frequency of said signal being continuously variable, as well as means for converting a certain frequency value into a value representing the gas bottle filling level.

Advantageously, the signal applied to the loudspeaker is generated by a voltage-controlled oscillator which is in turn controlled by a microprocessor.

The resonant frequency is determined by comparing the phase of the signal used for exciting the gas bottle via the loudspeaker with that of the signal from the microphone. To avoid acoustic feedback, one may proceed as follows: The voltage-controlled oscillator generates an alternating signal which is on the one hand used for driving the loudspeaker, and on the other hand for driving the phase detector. A phase detection, and a phase comparison of the signal transmitted to the phase detector by the voltage-controlled oscillator and the signal provided by the microphone are only performed at times when there is no signal from the loudspeaker.

The continuous alteration of the frequency of the loudspeaker drive signal is preferably obtained by sweeping the frequency from a maximum value to a minimum value or from a minimum value to a maximum value.

After a resonant frequency has been established, a phase locked loop (PLL) circuit is activated, causing a pause in the continuous alteration of the frequency of the loudspeaker drive signal, with the frequency set at this time, i.e. the resonant frequency, being maintained.

However, it is also possible to determine the precise resonant frequency by controlling the voltage-controlled oscillator by means of a PI (proportional and integral) amplifier before activating the phase-locked loop circuit.

The signal from the microphone is preferably band-pass filtered so as to filter out harmonic frequencies as well as disturbing noise. Preferably, the signal from the microphone is controlled to a constant level by an automatic gain control (AGC) circuit.

Being altered continuously, the frequency passes a frequency range of between 50 Hz and 5 kHz, preferably approx. 250 Hz and 2.5 kHz.

Moreover, it is possible to also determine the temperature of the gas bottle. This temperature may then be considered when the value of the resonant frequency is converted into a value representing the filling level. While the established resonant frequency may be converted into the filling level of the gas bottle on the basis of a calibration table stored in the microprocessor, it is also possible to determine it mathematically, by means of a formula expressing the relationship between the filling level and the resonant frequency.

Furthermore, the loudspeaker drive signal is controlled to be of a constant amplitude.

Finally, the conversion result is automatically indicated on a display.

Further advantageous embodiments are described in the subclaims.

Further details, features and advantages of the invention may be gathered from the following description of an embodiment schematically illustrated in the drawings, in which.

Figure 1:
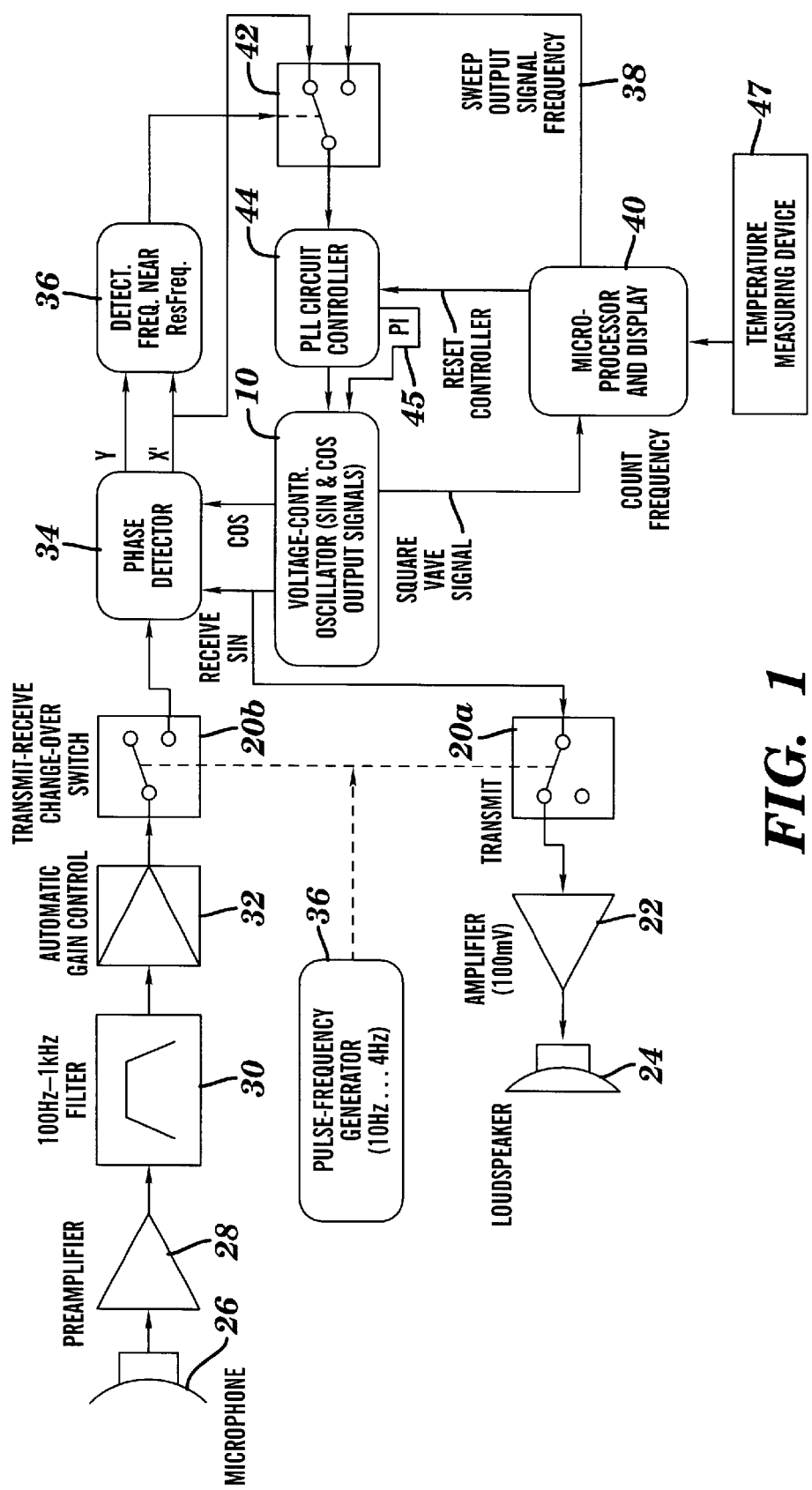
FIG. 1 is a schematical block diagram view of a circuit for implementing the method according to the invention.

FIG. 1 shows the block diagram view of a circuit for implementing the method of the invention. In this circuit, a voltage-controlled oscillator (VCO) outputs sine and cosine signals. Preferably, a voltage-controlled oscillator is used here whose output voltage contains very weak harmonic distortions. This helps avoid resonances which might for example be generated by difference frequencies of high harmonic proportions. One of the two output signals is applied to a loudspeaker 24 by a transmit-receive change-over switch consisting of a change-over switch 20a on the transmitting end and a change-over switch 20*b* on the receiving end, via the change-over switch 20*a* on the transmitting end and an amplifier 22 having a power of e.g. 100 mW. Said loudspeaker 24 is attached to the gas bottle (not shown) whose filling level is to be determined. Further installed on said gas bottle is a microphone 26 whose signals are transmitted to an automatic amplification control (AGC) circuit 32 via a preamplifier 28 and a band-pass filter 30. Said bandpass filter 30 serves to filter out undesired resonances from components on said bottle, e.g. handles and the like, as well as undesired noise. The transmission band of said band-pass filter is 50 Hz to 5 kHz, preferably 100 Hz to 1 kHz. The AGC circuit 32 makes it possible to use the method according to the invention with the most varied kinds of bottles as well as with the most varied positions of the loudspeaker and the microphone on the bottle. Since the signal from the microphone 26 is always automatically controlled to a certain constant level, a microphone signal is obtained as a result whose level has been adapted to the subsequent circuit and which can be used for the most varied kinds of bottles and the most varied microphone and loudspeaker positions. Furthermore, the signal from the microphone 26 passes through the receiving-end part 20*b* of the transmit-receive change-over switch. Said transmit-receive change-over switch 20*a*, 20*b* will prevent strong feedback between the loudspeaker and the microphone. Such feedback is detrimental to a smooth functioning of the phase detector 34, in particular if the resonances to be determined are weak. The transmit-receive change-over switch 20*a*, 20*b* shows the solution to this problem: The signal from the microphone 26 will only be evaluated in the phase detector 34 at times when the signal transmission to the loudspeaker 24 has been interrupted by the transmitting-end part 20*a* of the transmit-receive change-over switch. The equivalent of the signal transmitted to the loudspeaker 26 when the receiving-end part 20*b* of the transmit-receive change-over switch is in the ON position is constantly transmitted to the phase detector 34. In other words, the send signal is thus pulsed, i.e. it is transmitted, then there is a short pause, and subsequently the signal from the microphone to the phase detector is evaluated in the phase detector. A preferred mode of operation is known under the term "switched PWM (Pulse Width Modulation)". The transmit-receive change-over switch 20*a*, 20*b* has a switching frequency of approx. 1 Hz to 25 Hz, preferably 4 Hz to 10 Hz, with this switching signal being provided by a pulse-frequency generator 36. The pulsed mode of operation also prevents the resonance of the device housing of the circuit for implementing the method according to the invention from affecting the determination of the filling level since such resonance has a substantially shorter decay time.

At the described times, the phase detector 34 constantly establishes the phase difference between the signal from the microphone 26 and the signal from the voltage-controlled oscillator 10, with the frequency of the signal from the voltage-controlled oscillator being varied continuously, i.e. continuously going down from a maximum value to a minimum value or vice versa, passing from a minimum value to a maximum value. This instruction to the voltage-controlled oscillator 10 is passed to the voltage-controlled oscillator 10 by a microprocessor 40 connected to a display, via path 38. This continuous frequency alteration is also commonly referred to as sweeping. If a phase angle rotation is now detected, this means that a resonant frequency has been found. When a frequency is detected close to the resonant frequency, the voltage-controlled oscillator 10 will be decoupled by a component 36 from the instruction of the microprocessor 40 to sweep the frequency of the output signal, by a switching operation in component 42. Since the circuit has been designed such that it will only be sensitive in a very narrow frequency band around the current resonant frequency, this makes the system almost insensitive to background noise. Instead of sweeping, a phase-locked loop circuit will now be activated. This circuit contains the phase detector, with the controller for the PLL circuit being implemented in block 44. The PLL circuit compares the phases of the two said signals with each other, and the frequency will be precisely controlled to the resonant frequency. In the embodiment, the controller 44 for the PLL circuit furthermore contains a PI 45 (proportional and integral) controller to enable it to control the voltage-controlled oscillator in such a manner that—once it has passed a resonant frequency—it will control to the exact resonant frequency and the PLL circuit will consequently be closed. The stability of this frequency is reproducibly better than 0.1 Hz. In particular, this PI controller cooperates favourably with the AGC circuit 32 since a stabilization of the amplitude of the signal from the microphone 26 is obtained this way. This consequently also makes the contact pressure of the loudspeaker on the gas bottle less critical. After closing the PLL circuit, i.e. the voltage-controlled oscillator 10 outputs an output signal with the resonant frequency, any further noise from the environment will not have any effect, i.e. the evaluation may proceed without interference.

The voltage-controlled oscillator 10 furthermore outputs a square wave signal to the microprocessor 40, the frequency of which corresponds to that of the signal transmitted to the loudspeaker 24. This frequency is determined by the microprocessor, converted into a value representing the filling level of the gas bottle and indicated on a display. It is also possible to leave the conversion and displaying active permanently, i.e. already when sweeping the frequency of the output signal of the voltage-controlled oscillator 10, in which case, after closing the PLL circuit, the current filling level will immediately appear on the display. Although the conversion of the established resonant frequency into the filling level of the gas bottle may be performed by means of a calibration table stored in the microprocessor, it is likewise possible to determine it mathematically using a formula expressing a relationship between the resonant frequency and the filling level.

Furthermore, a temperature measuring device 47 may be connected to the circuit of FIG. 1 which will sense the temperature of the shell surface of the gas bottle whose filling level is to be determined, by means of a contacting temperature sensor (not shown). The temperature measured will be proportional to the gas pressure on the inside of the bottle, and the resonant frequency measured may be corrected in accordance with the gas pressure determined.

The microprocessor 40 is furthermore connected to the controller for the PLL circuit 40 in order to cancel the closure of the PLL circuit for a new measuring operation, i.e. to reset the controller for the PLL circuit.

The following Table 1 illustrates the relationship between the total weight and the resonant frequency for a certain gas bottle, in which the determined phase is additionally indicated in degrees.

TABLE 1

| Total Weight kg | Resonant Frequency Hz | Phase (Degrees) |
| --- | --- | --- |
| 12.6 | 301 | 90 empty |
| 12.92 | 279 | 90 |
| 13 | 285.4 | 90 |
| 14.24 | 298.1 | 90 |
| 15.24 | 322 | 90 |
| 15.8 | 340 | 90 |
| 16.2 | 350 | 90 |
| 17.52 | 404 | 90 |
| 18.26 | 443.6 | 90 |
| 19.28 | 469.4 | 90 |
| 20.2 | 550 | 90 |
| 22.04 | 671 | 90 |
| 22.44 | 712 | 90 |
| 23.52 | 732 | 0 full |

Figure 2:
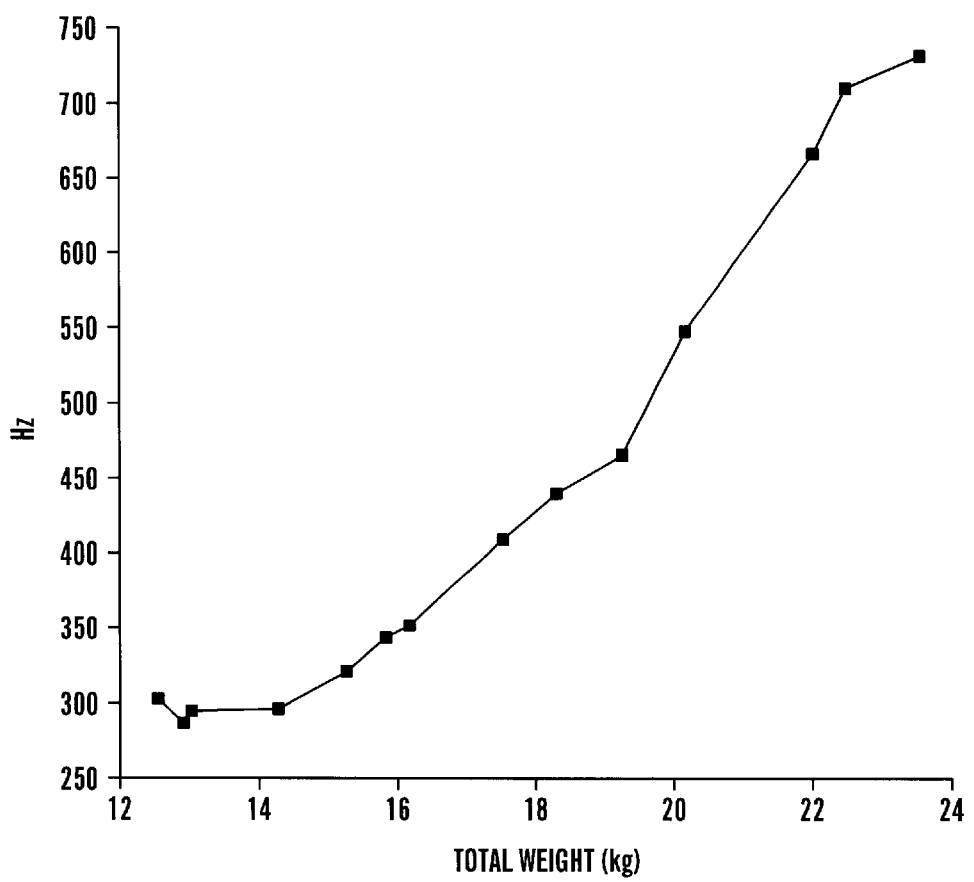
FIG. 2 is a calibration graph showing the relationship between the total weight and the resonant frequency.

This relationship is graphically illustrated in FIG. 2, with the total weight in kg being plotted on the abscissa and the resonant frequency in Hz being laid off on the ordinate. For the purposes of this illustration, see Table 1, the gas bottle has been chosen to have an empty weight of 12.6 kg. It may be gathered from this illustration that—with the exception of the starting range—i.e. with very low filling levels, the resonant frequency increases with the increasing filling level of the gas bottle.

Figure 3:
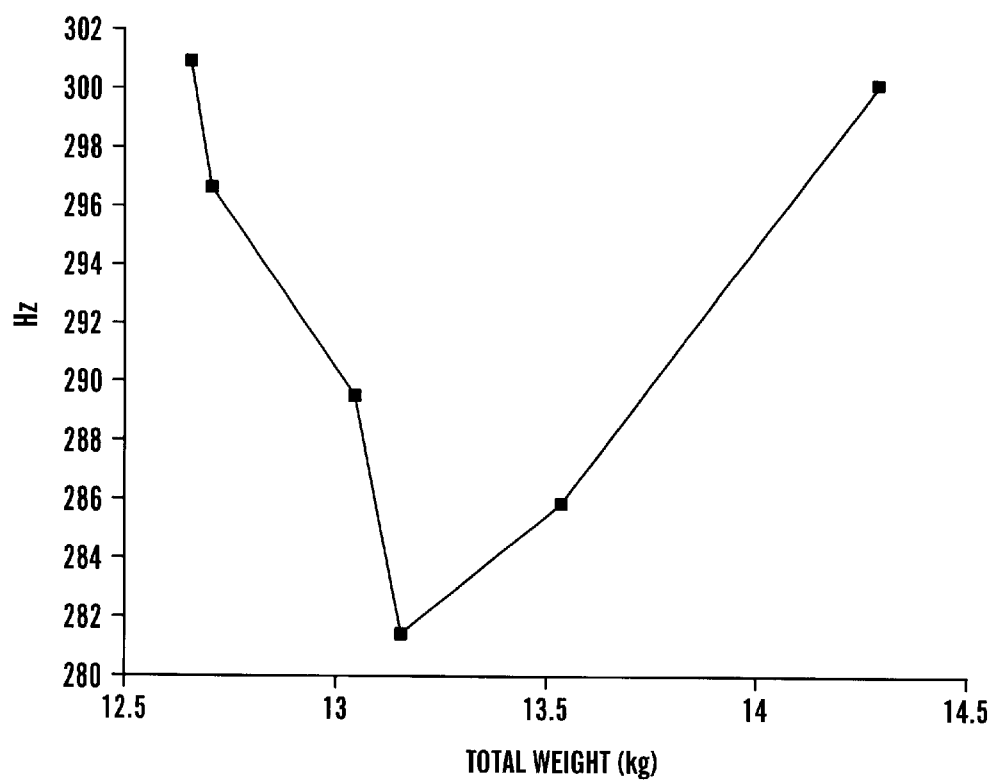
FIG. 3 is a view of the interdependence of the total weight and the resonant frequency for a range in which the gas bottle whose filling level is to be determined is almost empty.

FIG. 3 is a higher resolution view of the range of FIG. 2 which relates to very low total weight. The corresponding numerical values are listed in Table 2.

TABLE 2

| Total Weight kg | Resonant Frequency Hz |
| --- | --- |
| 12.64 | 300.9 |
| 12.68 | 296.7 |
| 13.02 | 289.7 |
| 13.14 | 281.6 |
| 13.52 | 286.0 |
| 14.28 | 300.4 |

The circuit for implementing the method according to the invention may be included in a portable device, preferably of the battery-powered type.

As regards implementation, two variants may essentially be taken into account: in a first variant, the oscillator 10 as well as the phase detector 34 have been designed for analog operation. In the second variant, only the microphone preamplifier 28 as well as the loudspeaker amplifier 22 are analog in operation, while all other components are digital. What is particularly advantageous about such a comprehensively digital implementation is that there will be no feedback of signals from any functional groups, except for the microprocessor. The entire measuring step, from the generation of the drive signals to the phase comparison, is performed totally in one and the same processor. This allows defective circuit boards to be spotted more easily and the number of components to be reduced. Furthermore, for changing the properties of a measuring operation, e.g. the speed of a sweep cycle, it will suffice to merely change the software. This can be done in a simple way. Since also the frequency range is determined by means of software, other bottles and other kinds of gases may be measured with the same hardware, by merely changing the relevant software parameters.

In the digital implementation, the microphone signal returned by the bottle is converted by means of an analog-digital converter (not shown) for reading into the microprocessor. It is also possible to use a digital filter for filtering out noise from the environment.

What is claimed is:

1. A method for determining the contents of a gas bottle comprising:
    a) Exciting a gas bottle by applying an excitation signal to a loudspeaker mounted on said gas bottle;
    b) comparing a phase angle of the signal used for excitation with that of a signal from a microphone mounted on said gas bottle;
    c) continuously altering a frequency of the signal used for excitation by sweeping the frequency from a maximum value to a minimum value or from a minimum value to a maximum value;
    d) intermittently interrupting the excitation signal to the loudspeaker while maintaining the excitation signal for comparison of the phase angle between the excitation signal and the signal from the microphone;
    e) establishing a resonant frequency when the phase angle between the excitation signal and the signal from the microphone exhibits a phase angle rotation; and
    f) converting the value of the resonant frequency into a value representing the filling level of the gas bottle.

2. The method as claimed in claim 1 wherein the signal used for excitation is generated by a voltage-controlled oscillator.

3. The method as claimed in claim 2 wherein the voltage-controlled oscillator is controlled by a microprocessor.

4. The method as claimed in claim 1 wherein the resonant frequency is determined based on a comparison of the phase of the signal used for excitation with the phase of the signal from the microphone.

5. The method as claimed in claim 1 wherein, upon detection of a resonant frequency, a phase-locked loop circuit is activated.

6. The method as claimed in claim 5 wherein, before the phase-locked loop circuit is activated, the exact resonant frequency is set by controlling the voltage-controlled oscillator by means of a PI controller.

7. The method as claimed in claim 1 wherein the signal from the microphone is band-pass-filtered.

8. The method as claimed in claim 1 wherein the signal from the microphone is controlled to a constant level.

9. The method as claimed in claim 1 wherein the frequency passes a frequency range of between 250 Hz and 2.5 kHz during continuous alteration.

10. The method as claimed in claim 1 wherein the loudspeaker drive signal is a pulsed signal and the signal from the microphone is evaluated in the pulse breaks.

11. The method as claimed in claim 10 wherein the pulse frequency is between 4 Hz and 10 Hz.

12. The method as claimed in claim 1 wherein the temperature of the gas bottle is determined additionally and taken into account when the resonant frequency is converted into the filling level.

13. The method as claimed in claim 1 wherein the loudspeaker drive signal is controlled to a constant amplitude.

14. The method as claimed in claim 1 wherein after conversion, the filling level of the bottle is automatically indicated on a display.

15. The method as claimed in claim 1 wherein the conversion of the resonant frequency into the filling level of the gas bottle is performed by looking up in a calibration table stored in the microprocessor or by evaluating a previously determined mathematical inter-relationship of these values.

16. An apparatus for determining the contents of a gas bottle comprising:

a) a loudspeaker to which an excitation signal for exciting the gas bottle may be applied and which may be mounted on the gas bottle in operation;

b) a phase detector for comparing the phase angle of the signal used for excitation with that of a signal from a microphone mounted on the gas bottle;

c) an oscillator outputting the signal used for excitation, with the frequency of this signal being continuously alterable;

d) a change-over-switch for intermittently interrupting the excitation signal to the loudspeaker while maintaining the excitation signal to the phase detector for determining a resonant frequency when a phase angle rotation occurs between the excitation signal and the signal from the microphone; and e) means for converting the resonant frequency into a filling level of the gas bottle.

* * * * *